G. W. HILDRETH.
Hanging Bells.
No. 13,089.
Patented June 19, 1855.
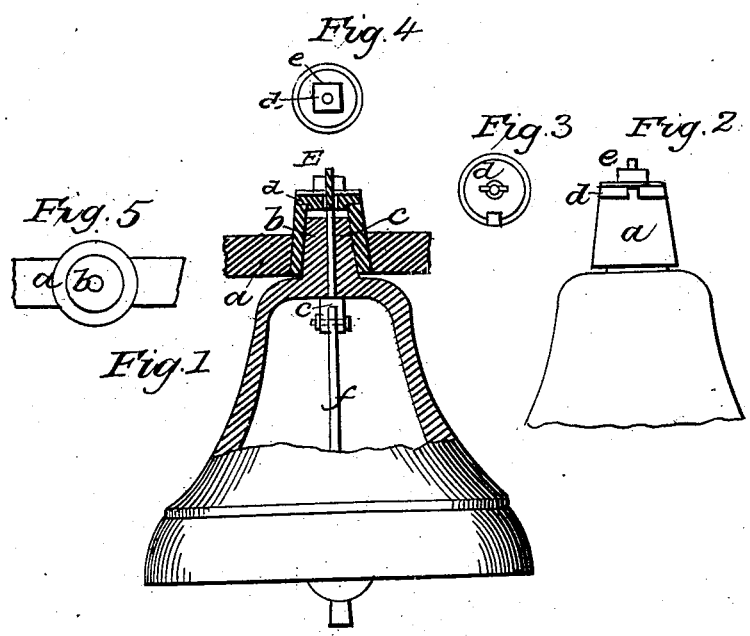

UNITED STATES PATENT OFFICE.

GEORGE W. HILDRETH, OF LOCKPORT, NEW YORK.

MODE OF HANGING BELLS.

Specification forming part of Letters Patent No. 13,089, dated June 19, 1855; Reissued May 1, 1860, No. 955.

*To all whom it may concern:*

Be it known that I, GEORGE W. HILDRETH, of Lockport, in the county of Niagara and State of New York, have invented a new and Improved Mode of Hanging Bells; and I do hereby declare that the following is a full and exact description.

My invention consists in hanging church bells or any other bells when hung with yokes as herein specified so as to change the strike of the tongue whenever it is desired. By means of a round tapering shank cast upon the top of the bell with a corresponding hole cast or made through the yoke $u$, as will be seen by the sectional drawings Figure 1, $a$ and $b$.

The bell is made fast in the yoke by a bolt $c$, with "head and ears" (for the tongue to swing in below) with the bell resting on the shoulders of said bolt, which bolt $c$, passes up through the shank of the bell, and through a metal cap $d$, with a nut $e$, on the top end of said bolt. By screwing up the nut $e$, the shank $b$, is drawn firm into the yoke $a$, so it will not vibrate or turn a particle. To change the bell slacken the nut $e$, a little and the bell will freely turn resting on the shoulders of the bolt $c$, and is made fast again by tightening up the nut $e$. To secure the swing of the tongue (always) at right angles with the yoke. The cap $d$, is doweled to the yoke $a$, as seen in Fig. 2 $d$ and $a$, so it cannot turn with the nut $e$. And the bolt $c$, is prevented from turning by a pin, key, or projection from the sides of the bolt $c$, sliding in grooves in the cap $d$, as seen in Fig. 3, (also in Fig. 1 at $d$,) (or the bolt $c$, may be square where it passes through the cap $d$). Fig. 4 is the top view of the cap and nut $e$ and $d$. Fig. 5 is the under side view of the yoke and the shank or stem of the bell that goes into the yoke $a$ and $b$.

What I claim as my invention and desire to secure by Letters Patent, is—

1. The round tapering shank $b$, and corresponding hole in the yoke $a$, in combination with the bolt $c$, and cap $d$, to secure the bell firm into the yoke.

2. I claim the doweling of the cap $d$, to the yoke $a$, also the manner of securing the bolt $c$, from turning in the cap $d$, for the purposes herein set forth.

G. W. HILDRETH.

Witnesses:
WILLIAM E. HOUSE,
JOSEPH CLARKE.

[FIRST PRINTED 1912.]